United States Patent
Hagihara

(10) Patent No.: US 8,505,866 B2
(45) Date of Patent: Aug. 13, 2013

(54) SENSOR ASSEMBLY AND FIXING METHOD THEREOF

(75) Inventor: Takanori Hagihara, Shizuoka (JP)

(73) Assignee: Jatco Ltd, Fuji-shi (JP)

( * ) Notice: Subject to any disclaimer, the term of this patent is extended or adjusted under 35 U.S.C. 154(b) by 324 days.

(21) Appl. No.: 12/720,464

(22) Filed: Mar. 9, 2010

(65) Prior Publication Data

US 2010/0243842 A1 Sep. 30, 2010

(30) Foreign Application Priority Data

Mar. 31, 2009 (JP) .................................. 2009-84847

(51) Int. Cl.
*A47F 5/00* (2006.01)
(52) U.S. Cl.
USPC ........................................ 248/309.1; 248/542

(58) Field of Classification Search
USPC ............................ 248/542, 309.1, 314, 213.2
See application file for complete search history.

(56) References Cited

U.S. PATENT DOCUMENTS

| 4,090,099 | A | * | 5/1978 | Daffron | ........................ 310/168 |
| 5,423,638 | A | * | 6/1995 | Merriman | ..................... 405/292 |
| 2009/0206218 | A1 | * | 8/2009 | Massey | ..................... 248/220.21 |

FOREIGN PATENT DOCUMENTS

| JP | 08-264971 A | 10/1996 |
| JP | 2001-271918 A | 10/2001 |
| JP | 2002-303635 A | 10/2002 |

* cited by examiner

*Primary Examiner* — Amy J Sterling
(74) *Attorney, Agent, or Firm* — Foley & Lardner LLP

(57) ABSTRACT

A sensor assembly that is fixed to a fixing subject member includes a bracket that is fixed to a fixing subject member, a spacer that is attached to the bracket and contacts the fixing subject member, and a rotation sensor that is held by the bracket and is sandwiched between the spacer and the bracket.

9 Claims, 4 Drawing Sheets

SENSOR ASSEMBLY AND FIXING METHOD THEREOF

TECHNICAL FIELD OF THE INVENTION

This invention relates to a sensor assembly.

BACKGROUND OF THE INVENTION

Upon use, a sensor must be fixed in a position where it can detect a detection subject accurately. Therefore, in JP2001-271918A, a rotation sensor that detects a rotation speed of a rotational element in an automatic transmission in order to control the automatic transmission is attached via a bracket to a control valve provided on a case lower portion of the automatic transmission. More specifically, an oil pressure sensor and an oil temperature sensor are attached to the bracket together with the rotation sensor to form a sub-assembly, whereupon the sub-assembly is fastened to the control valve by a bolt.

SUMMARY OF THE INVENTION

However, with the sensor attachment method described in the above document, the rotation sensor cannot be fixed precisely in a position where the rotation speed of the detection subject can be detected accurately. More specifically, a clearance for assembly purposes is required between the bolt and a bolt hole of the bracket, and the positional precision of the rotation sensor deteriorates in accordance with this clearance. Furthermore, when the bracket is formed simply by pressing a metal plate, it is difficult to improve the shape precision of the bracket, and in order to improve the shape precision of the bracket, the bracket must be subjected to cutting processing and the like, leading to an increase in cost. Moreover, if the bracket is deformed by a tightening force of the bolt, the rotation sensor cannot be fixed precisely in a position where the rotation speed of the detection subject can be detected accurately.

An object of this invention is to provide a sensor assembly with which cost increases can be suppressed and a rotation sensor can detect a rotation speed accurately even if a bracket deforms.

According to an aspect of the present invention, a sensor assembly that is fixed to a fixing subject member includes a bracket that is fixed to a fixing subject member, a spacer that is attached to the bracket and contacts the fixing subject member, and a rotation sensor that is held by the bracket and is sandwiched between the spacer and the bracket.

According to another aspect of the invention, a method of fixing a sensor assembly to a fixing subject member is provided. The method includes preparing a bracket that is fixed to a fixing subject member, holding a rotation sensor to the bracket by sandwiched between the spacer and the bracket, and fixing the bracket that holds the rotation sensor and the spacer to the fixing subject member as the spacer contacts to the fixing subject member.

According to these aspects described above, the spacer is interposed between the rotation sensor and the fixing subject member and the rotation sensor is positioned relative to the fixing subject member by the spacer. As a result, cost increases can be suppressed and positional precision can be secured in the rotation sensor even if the bracket deforms when a bolt is tightened.

Embodiments and advantages of this invention will be described in detail below with reference to the attached figures.

DESCRIPTION OF THE PREFERRED EMBODIMENTS

Figure 1:
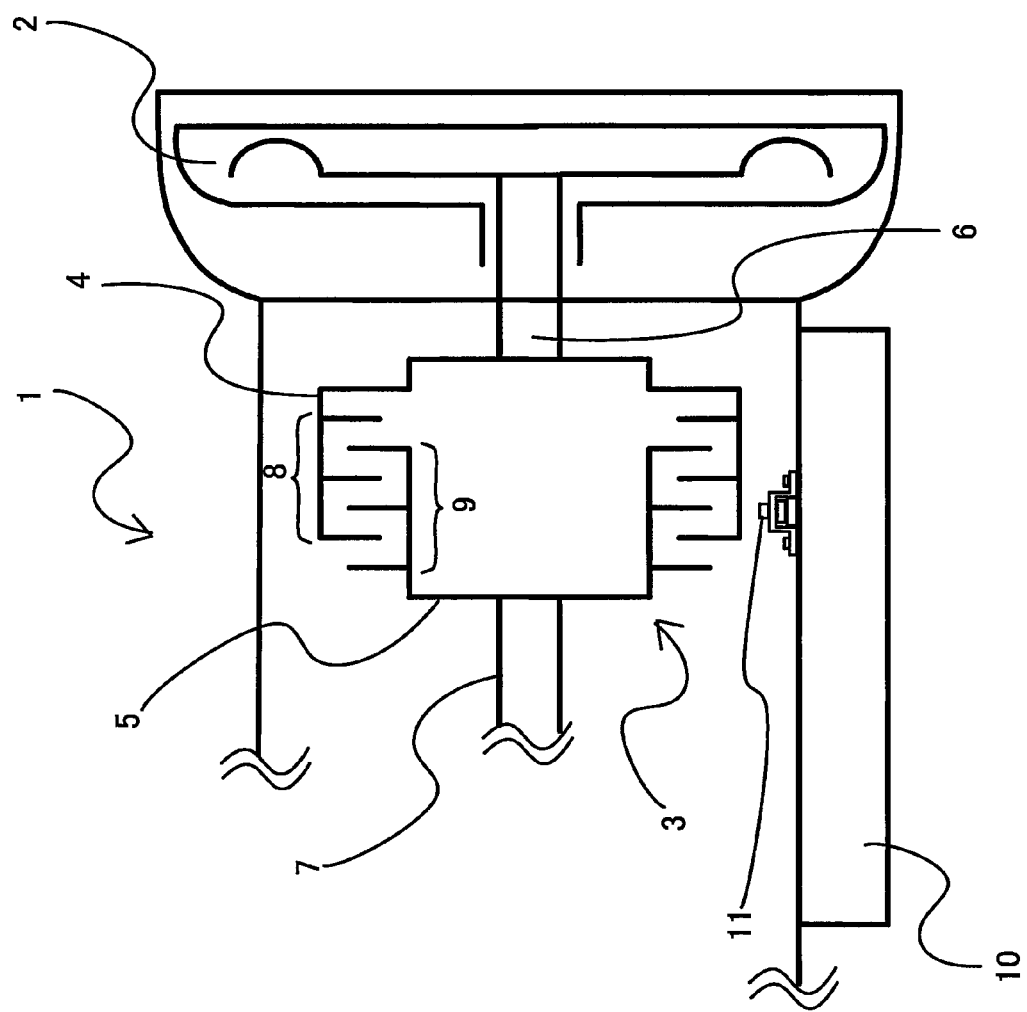
FIG. 1 is a schematic diagram showing an automatic transmission to which a sensor assembly according to an embodiment is applied.

FIG. 1 is a schematic diagram showing a part of an automatic transmission 1 for a vehicle to which a sensor assembly according to an embodiment of this invention is applied.

A torque converter 2 is connected to a drive plate, which is fixed to a crankshaft end portion of an engine, by a bolt or the like, and includes a pump impeller 2a that is driven to rotate directly by the crankshaft and a turbine runner 2b that is driven to rotate by the pump impeller 2a via a fluid.

A clutch mechanism 3 includes a clutch drum 4 fixed to an input shaft 6, which is connected to the turbine runner 2b, by a bolt or the like, a plurality of driven plates 8, respective outer peripheral portions of which engage with an inner peripheral portion of the clutch drum 4, drive plates 9 arranged alternately with the driven plates 8, a clutch hub 5, an outer peripheral portion of which engages with respective inner peripheral portions of the drive plates 9, and an intermediate shaft 7 connected to the clutch hub 5.

A control valve 10 is attached to a lower surface opening portion of the automatic transmission 1, and a rotation sensor 11 for detecting a rotation speed of the clutch drum 4 is disposed on an upper surface of the control valve 10.

Figure 2:
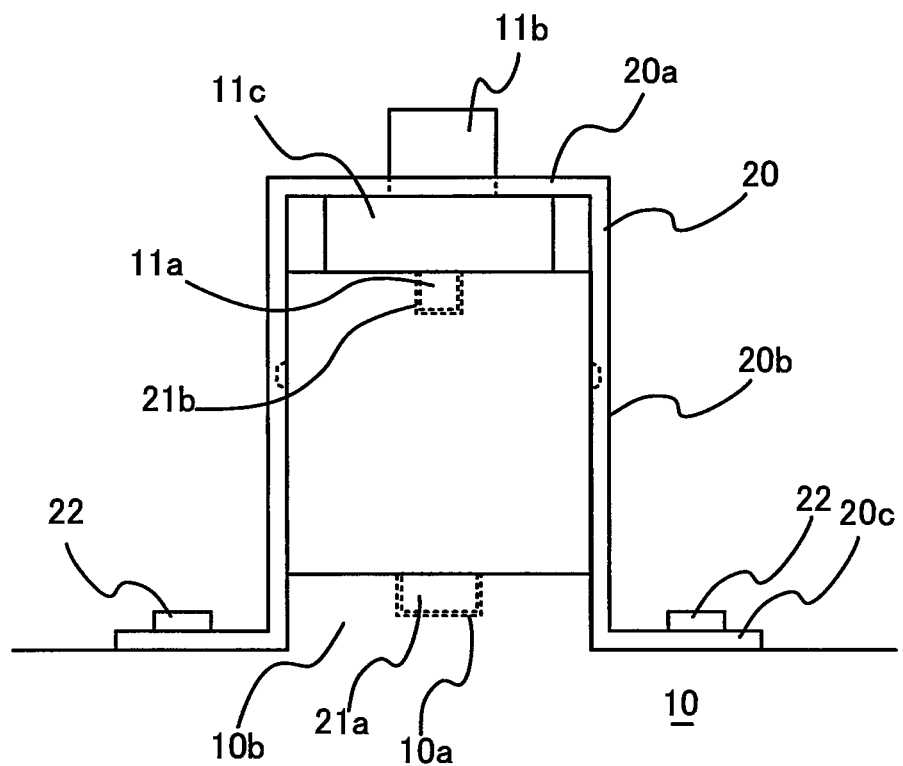
FIG. 2 is an enlarged view of a sensor attachment portion.
Figure 3:
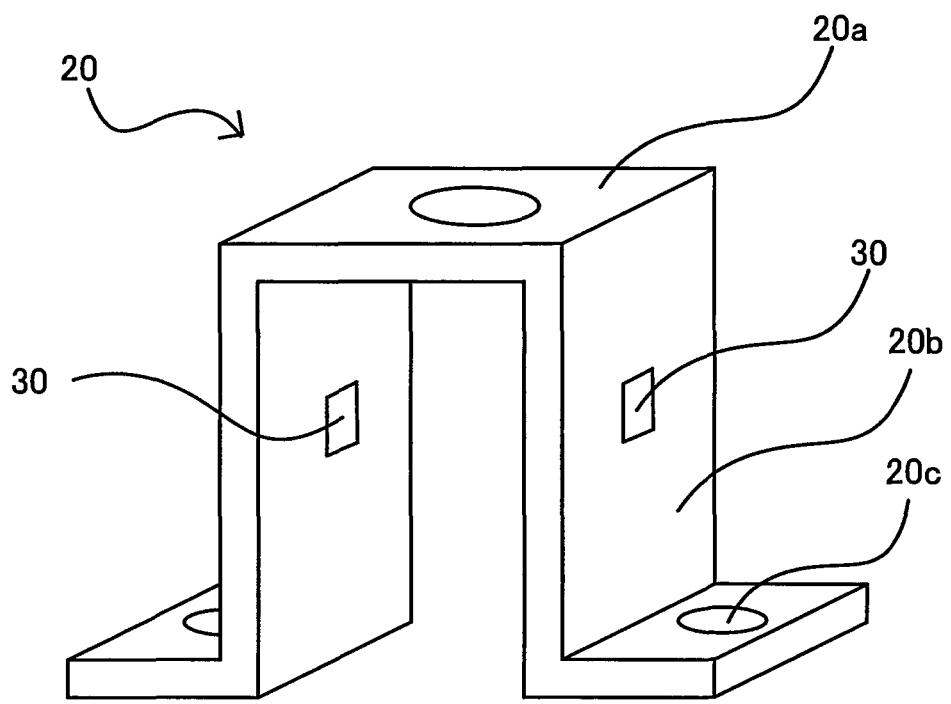
FIG. 3 is a detailed view of a bracket.
Figure 4:
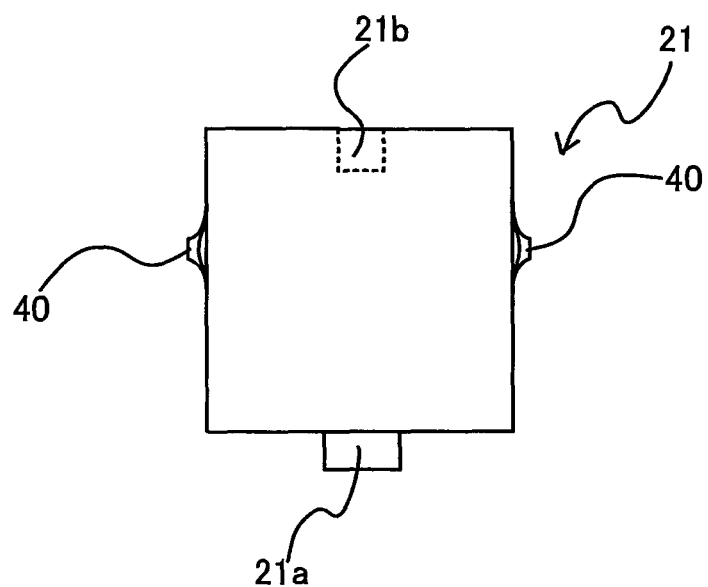
FIG. 4 is a detailed view of a spacer.

FIG. 2 is an enlarged view of an attachment part of the rotation sensor 11 shown in FIG. 1, and FIGS. 3 and 4 are views respectively illustrating a bracket 20 and a spacer 21 to be described below.

The rotation sensor 11 takes a stepped cylindrical shape including a detection portion 11b and a body part 11c having a larger diameter than the detection portion 11b. A cylindrical sensor projecting portion 11a is provided on a lower surface of the body part 11c.

The bracket 20 takes a doorway shape comprising an upper surface 20a having a hole that is penetrated by the detection portion 11b of the rotation sensor 11, two side faces 20b that extend from the upper surface 20a in the direction of the control valve 10, and an attachment surface 20c that extends parallel to an upper surface of the control valve 10 from a lower end of each side face 20b. A hole (to be referred to as a lock portion hereafter) 30 is provided in each side face 20b.

The spacer 21 is a resin rectangular parallelepiped in which a spacer recessed portion 21b into which the projecting portion 11a provided on the lower surface of the rotation sensor 11 fits is provided in an upper surface and a cylindrical spacer projecting portion 21a that fits into a recessed portion 10a provided in the control valve 10 is provided on a lower surface. A projecting portion (to be referred to as a spacer lock portion hereafter) 40 that engages with the lock portion 30 is provided on surfaces that oppose the respective side faces 20b of the bracket 20.

The spacer lock portion 40 may be molded integrally with the spacer member or attached to the side faces of the spacer 20 as a separate member. The spacer lock portion 40 that projects from the side face of the spacer 21 is engaged with the lock portion 30 upon elastic deformation of the side face 20b of the bracket 20. The positions in which the lock portion 30 and spacer lock portion 40 are provided will be described below.

These constitutional components are attached to the control valve 10 in the manner shown in FIG. 2 by the step of fitting the rotation sensor 11 to the spacer 21, and the step of engaging the rotation sensor 11 and the spacer 21 with the bracket 20. More specifically, the spacer 21 is disposed on the upper surface of the control valve 10 such that the spacer projecting portion 21a fits into the C/V recessed portion 10a, the rotation sensor 11 is disposed thereabove such that the sensor projecting portion 11a fits into the spacer recessed portion 21b, and the bracket 20 is placed over the rotation sensor 11 and the spacer 21 such that the detection portion 11b of the rotation sensor 11 penetrates the hole in the upper surface 20a of the bracket 20. The attachment surface 20c of the bracket 20 is then fastened to the upper surface of the control valve 10 by bolts 22 such that the rotation sensor 11 is fixed to the control valve 10 while being pressed from an upper side by the bracket 20.

The spacer lock portion 40 is engaged with the lock portion 30, whereby the spacer 21 is fixed to the bracket 20 and the body part 11c of the rotation sensor 11 is sandwiched between the upper surface 20a of the bracket 20 and the upper surface of the spacer 21. Hence, the bracket 20, the rotation sensor 11, and the spacer 21, which together constitute a sensor assembly, can be formed into a so-called sub-assembly without the need for a separate member to prevent the rotation sensor 11 from falling out of the bracket 20, and as a result, an assembly process of the automatic transmission 1 can be simplified.

As described above, the rotation sensor 11 is positioned relative to the spacer 21 by the sensor projecting portion 11a and the spacer recessed portion 21b, while the spacer 21 is positioned relative to the upper surface of the control valve 10 by the spacer projecting portion 21a and the C/V recessed portion 10a.

Further, play (clearance or looseness) between a side face of the cylindrical spacer projecting portion 21a and an inner peripheral surface of the C/V recessed portion 10a is set to be smaller than play between the spacer lock portion 40 and the lock portion 30. Hence, even when a dimension error occurs in the bracket 20, positional deviation of the spacer 21 relative to the control valve 10 is limited by the dimensions of the spacer projecting portion 21a and the C/V recessed portion 10a, and therefore positional deviation of the rotation sensor 11 relative to the control valve 10 can be suppressed.

Moreover, play between a side face of the cylindrical sensor projecting portion 11a and an inner peripheral surface of the spacer recessed portion 21b is set to be smaller than play between a side face of the detection portion 11b of the sensor 11 and an inner peripheral surface of the hole in the upper surface 20a of the bracket 20. Hence, even when a dimension error occurs in the bracket 20, positional deviation of the rotation sensor 11 relative to the spacer 21 is limited by the dimensions of the sensor projecting portion 11a and the spacer recessed portion 21b, and therefore positional deviation of the rotation sensor 11 relative to the spacer 21 can be suppressed.

In other words, the rotation sensor 11 is positioned by the spacer 21, and therefore the bracket 20 does not have to be subjected to cutting processing and the like in order to improve the shape precision of the bracket 20, for example, with the result that cost increases can be suppressed and positional precision can be secured in the rotation sensor. Moreover, even if the bracket 20 deforms when the bolt 22 is tightened, variation in the position of the rotation sensor 11 accompanying this deformation can be suppressed.

It should be noted that in the above embodiment, the spacer projecting portion 21a is inserted into the C/V recessed portion 10a, but the invention is not limited to this constitution, and any constitution that allows the spacer 21 to be positioned relative to the control valve 10, for example a constitution in which a recessed portion is provided in the spacer 21 and a projecting portion provided on the control valve 10 is fitted into the recessed portion, a constitution in which recessed portions are provided in both components and a single positioning pin is fitted into the two recessed portions, and so on, may be employed. This applies likewise to positioning of the rotation sensor 11 relative to the spacer 21.

Further, a constitution in which the spacer lock portion 40 is engaged with the lock portion 30 was described as a structure for attaching the spacer 21 to the bracket 20, but the invention is not limited to this constitution, and any constitution that prevents the spacer 21 from falling out of the bracket 20 when the sensor assembly is formed into a sub-assembly may be employed. Moreover, the spacer 21 is formed from resin but is not limited thereto.

Furthermore, in this embodiment, a constitution in which the rotation sensor 11 that detects the rotation speed of the clutch drum 4 is attached to the upper surface of the control valve 10 disposed in a main body lower portion of the automatic transmission 1 was described, but the invention is not limited to this constitution and may be applied similarly to any constitution in which a rotation sensor is fixed to another component.

The following effects are obtained from the embodiment described above.

(1) The rotation sensor 11, the bracket 20 that is fixed to the control valve (a fixing subject member) 10 while holding the rotation sensor 11, and the spacer 21 that is attached to the bracket 20 and contacts both the rotation sensor 11 and the control valve 10 in a state where the bracket 20 is fixed to the control valve 10 are provided, and the rotation sensor 11 is held by the bracket 20 while sandwiched between the spacer 21 attached to the bracket 20 and the bracket 20. As a result, cost increases can be suppressed and positional precision can be secured in the rotation sensor 11 even if the bracket 20 deforms when being fixed to the control valve 10.

(2) The play between the side face of the spacer projecting portion (a fitting portion provided on the spacer 21) 21a and the inner peripheral surface of the C/V recessed portion (a fitting subject portion provided in the fixing subject member) 10a is smaller than the play between the lock portion 30 and the spacer lock portion 40, and therefore positional deviation of the rotation sensor 11 relative to the control valve 10 can be suppressed even when a dimension error occurs in the bracket 20.

(3) The play between the side face of the sensor projecting portion (a fitting portion provided on the sensor) 11a and the inner peripheral surface of the spacer recessed portion (a fitting subject portion provided in the spacer) 21b is smaller than the play between the side face of the detection portion 11b of the rotation sensor 11 and the inner peripheral surface of the hole in the upper surface 20a of the bracket 20, and therefore positional deviation of the rotation sensor 11 relative to the spacer 21 can be suppressed. It should be noted that the above embodiment describes a structure in which a hole penetrated by the detection portion 11b of the rotation sensor is provided in the upper surface 20a of the bracket 20, but the invention is not limited to this structure, and a cutout penetrated by the detection portion 11b of the rotation sensor may be provided in the upper surface 20a of the bracket 20 instead.

Further, this invention is not limited to the embodiment described above, and may of course be subjected to various modifications within the scope of the technical spirit of the claims.

This application claims priority based on Japanese Patent Application No. 2009-84847, filed with the Japan Patent Office on Mar. 31, 2009, the entire content of which is incorporated into this specification by reference.

What is claimed is:

1. A sensor assembly that is fixed to a fixing subject member comprising:
   a bracket that is fixed to the fixing subject member, wherein the bracket comprises at least one side face having a hole;
   a spacer that is attached to the bracket and contacts the fixing subject member; and
   a rotation sensor that is held by the bracket and sandwiched between the spacer and the bracket,
   wherein the spacer comprises:
      a projecting portion disposed on a first surface of the spacer that engages with the hole in the side face of the bracket such that there is a first clearance between the projecting portion of the spacer and the hole, and
      a fitting portion disposed on a second surface of the spacer that projects into a fitting subject portion in the fixing subject member such that there is a second clearance between the fitting portion of the spacer and the fitting subject portion in the fixing subject member, and
   wherein the second clearance is smaller than the first clearance.

2. A sensor assembly that is fixed to a fixing subject matter comprising:
   a bracket that is fixed to the fixing subject member and has a plurality of side faces;
   a spacer that is attached to the bracket and contacts the fixing subject member; and
   a rotation sensor that is held by the bracket,
   wherein the rotation sensor comprising a body portion sandwiched between the spacer and the bracket and a detection portion protruding through a hole in the bracket such that there is a first clearance between the detection portion of the rotation sensor and the hole of the bracket,
   wherein the rotation sensor further comprises a fitting portion protruding from the body portion, the fitting portion being fitted into a fitting subject portion of the spacer such that there is a second clearance between the fitting portion of the rotation sensor and the fitting subject portion of the spacer, and
   wherein the second clearance is smaller than the first clearance between the detection portion of the rotation sensor and the first hole.

3. The sensor assembly as defined in claim 1, wherein the bracket comprises an aperture in a horizontal surface penetrated by a part of the rotation sensor such that there is a third clearance between the part of the rotation sensor and the aperture,
   wherein the rotation sensor comprises a fitting portion that is fitted into a fitting subject portion in the spacer such that there is a fourth clearance between the fitting portion of the rotation sensor and the fitting subject portion in the spacer, and
   wherein the fourth clearance is smaller than the third clearance between the part of the rotation sensor and the aperture.

4. The sensor assembly as defined in claim 1, wherein the rotation sensor comprises a body portion sandwiched between the spacer and the bracket and a detection portion protruding through an aperture of the bracket.

5. The sensor assembly as defined in claim 1, wherein the projecting portion of the spacer engages with the hole of the side face of the bracket upon deformation of the side face of the bracket.

6. The sensor assembly as defined in claim 1, wherein the fixing subject member is a control valve attached to a surface opening of an automatic transmission.

7. The sensor assembly as defined in claim 1, wherein the spacer is formed of resin.

8. The sensor assembly as defined in claim 1, wherein the at least one side face of the bracket comprises a first side face and a second side face, the first and second side faces each having a hole, wherein the spacer comprises two projecting portions that engage with the holes in the first and second side faces.

9. The sensor assembly as defined in claim 2, wherein the spacer comprises a projecting portion disposed on a surface of the spacer that opposes the at least one of the plurality of side faces of the bracket, and
   wherein the projecting portion of the spacer engages with a second hole in the at least one of the plurality of side faces of the bracket.

* * * * *